W. H. DAVIDSON.
VEHICLE WHEEL.
APPLICATION FILED DEC. 1, 1916.
1,279,284.
Patented Sept. 17, 1918.
2 SHEETS—SHEET 2.
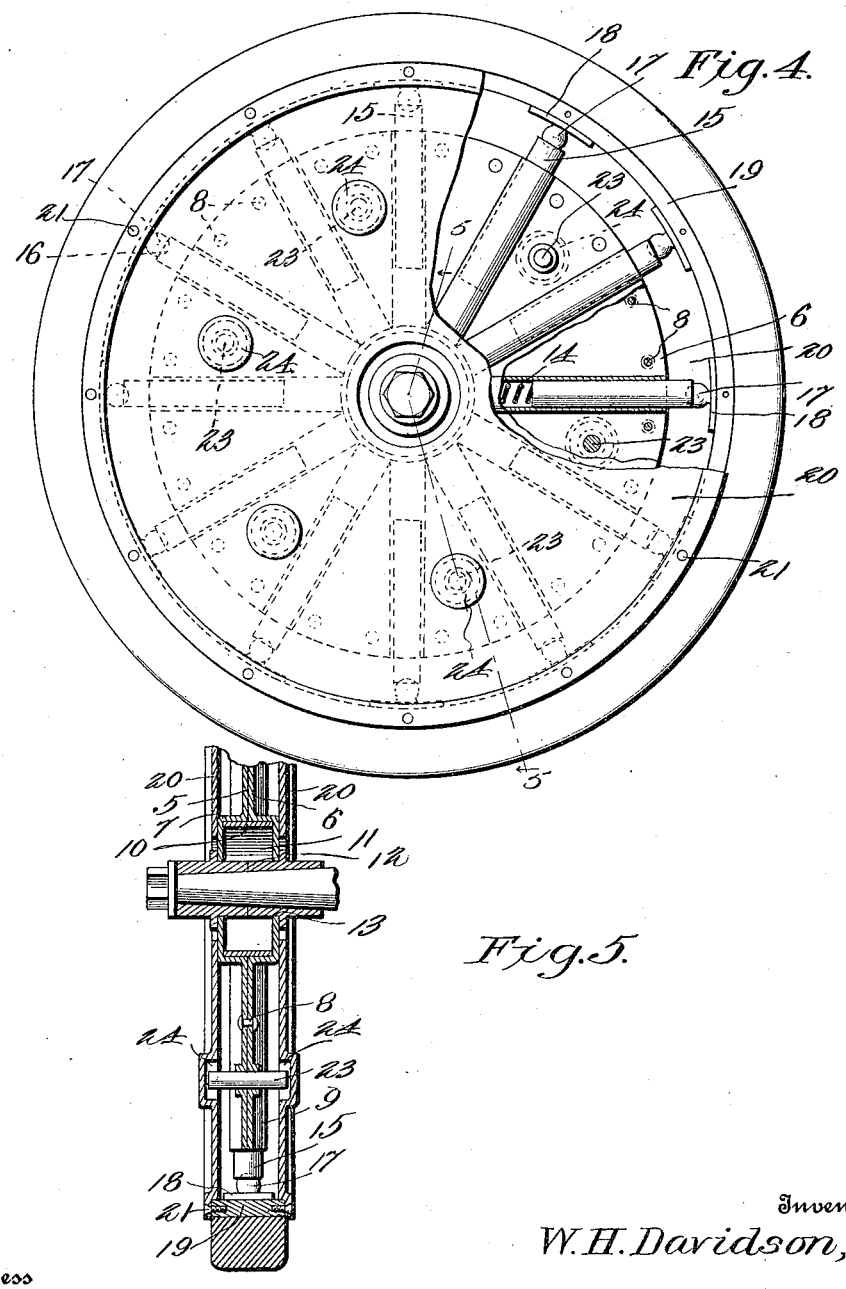
Witness
Inventor
W. H. Davidson,
By Victor J. Evans
Attorney

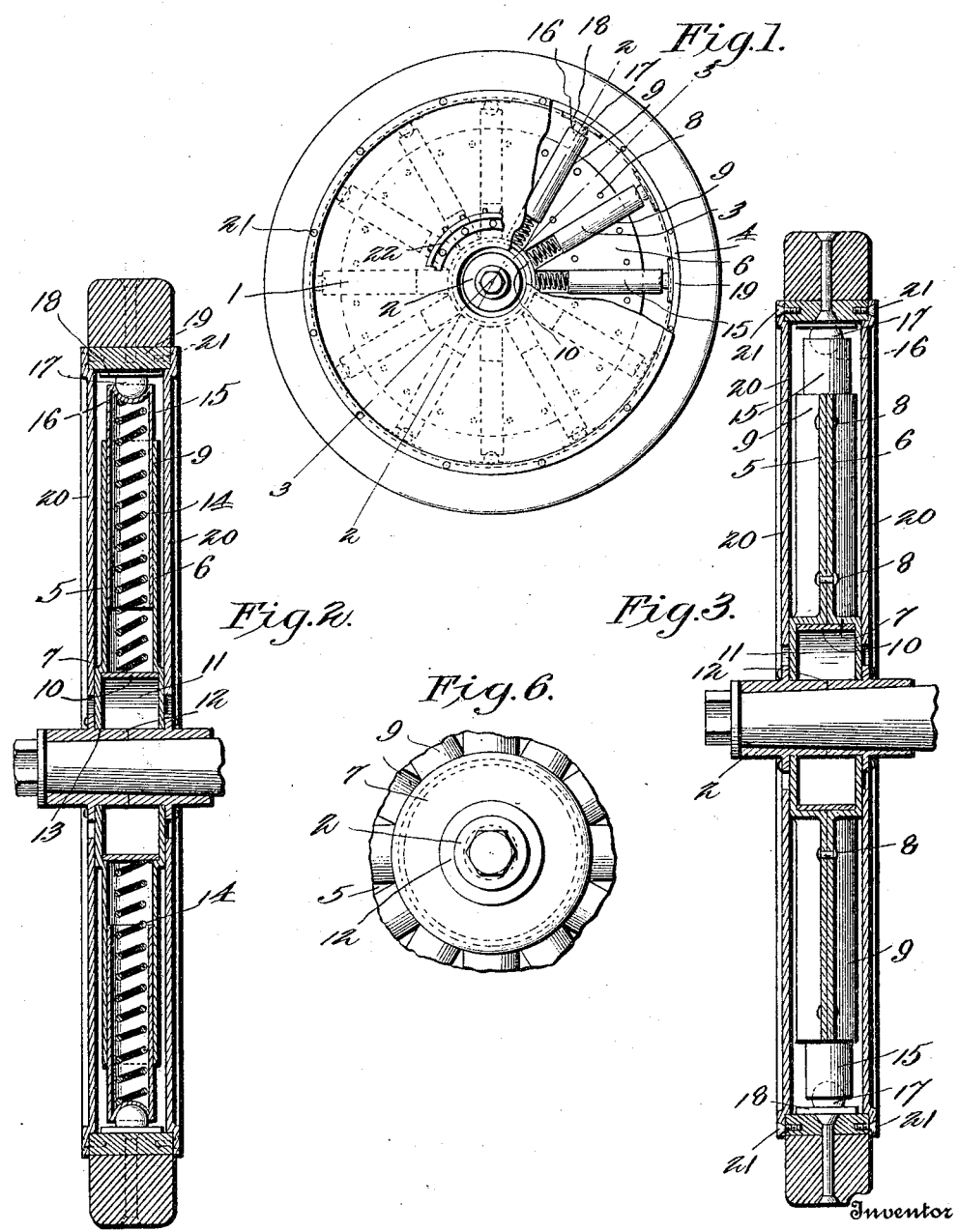

UNITED STATES PATENT OFFICE.

WALTER HENRY DAVIDSON, OF KALGOORLIE, AUSTRALIA.

VEHICLE-WHEEL.

1,279,284.   Specification of Letters Patent.   Patented Sept. 17, 1918.

Application filed December 1, 1916.   Serial No. 134,433.

*To all whom it may concern:*

Be it known that I, WALTER HENRY DAVIDSON, a subject of the King of Great Britain, residing at Kalgoorlie, Australia, have invented new and useful Improvements in Vehicle-Wheels, of which the following is a specification.

This invention relates to vehicle wheels and more particularly to a vehicle wheel of the resilient type which is especially adapted for use in connection with motor driven vehicles, such as automobiles, and the like.

The primary object of the invention is to provide a resilient wheel which is so constructed that when applied to a vehicle of the class described, the vibration and jars incident to the travel of the vehicle over a rough and uneven road will be instantly absorbed by the wheel without the necessity of using a cushioning means, such as a pneumatic tire, or the like, for this purpose.

Another object of the invention is to provide a wheel of the class described in which the wheel hub has mounted to slide therein spring pressed spokes upon the outer ends of which are mounted to rock shoes held in frictional engagement with the inner peripheral faces of the wheel rim by said spokes and coacting with the spokes to permit the wheel rim to move both circumferentially and in a plane vertical to the wheel hub when the wheel is brought into contact with an obstruction, or the like, without imposing a strain upon the spokes of the wheel which would tend to cause the spokes to bind in the hub of the wheel and retard the sliding movement of the rim upon the shoes.

A still further object of the invention is the provision of a resilient wheel which is so constructed that it may be used upon motor vehicles, and the like, having chain driven wheels or chain driven axles upon which the wheels are mounted.

With these and other objects in view, the invention resides in the novel combination and arrangement of parts, which will be hereinafter described and particularly pointed out in the claim.

The preferred embodiment of the invention has been illustrated in the accompanying drawings, although no restriction is necessarily made to the precise details of construction therein shown, as changes, alterations, and modifications, within the scope of the claim may be resorted to when desired.

Like characters of reference denote corresponding parts throughout the several views in the drawing, in which:

Figure 1 is a view in side elevation with parts broken away of a resilient wheel constructed in accordance with the invention.

Fig. 2 is an enlarged vertical transverse section on the line 2—2 of Fig. 1.

Fig. 3 is a view similar to Fig. 2 on the line 3—3 of Fig. 1.

Fig. 4 is a side elevation partly in section of a slightly modified form of the invention.

Fig. 5 is a vertical transverse section on the line 5—5 of Fig. 4.

Fig. 6 is a plan view of one of the hub sections.

Referring now to the drawings in detail, the numeral 1 designates the improved vehicle wheel which comprises a hub 2 having extending radially therefrom spokes 3 upon the outer ends of which is arranged a rim 4 movable both circumferentially about the hub and in a plane vertical thereto when a strain is imposed upon the wheel or the same is brought into contact with an obstruction.

The hub 2 is formed from a pair of disklike plates 5 and 6 with each plate having formed therein a centrally located and circular depression 7 communicating with the radially extending channels in the plates 5 and 6 which when the plates are arranged in opposed relation and connected through the medium of suitable fastening elements 8 forms within the hub 2 spoke pockets 9, the inner ends of which are closed by a band 10 arranged in the chamber 11 formed by the depressions 7 in the plates 5 and 6, said chamber having arranged therein a bearing sleeve 12 passing through centrally disposed openings 13 in the plates 5 and 6 and adapted to receive therein the spindle of an axle upon which the wheel is mounted to turn.

Disposed in each spoke pocket 9 in the hub 2 is a coiled expansion spring 14 having a length greater than the length of the pocket 9 and extending between the band 10 and the closed outer end of a tubular spoke 15 mounted to slide in the pocket 9, said closed outer ends of the spokes 15 having formed therein bearing sockets 16 with each socket receiving therein a ball shaped bearing head 17 on a shoe 18 which through the connection of the head 17 with the socket 16 in the spoke 15 is mounted to rock on the outer end of said spoke.

A rim 19 extends circumferentially about the hub 2 and is held in contact with the outer face of the shoes 18 by the expansion springs arranged in the hollow spokes 15 and pockets 9 in the hub 2 so that upon contact of the wheel with an obstruction or when an undue strain is imposed thereon, the rim 19 is free to turn circumferentially about the hub on the shoes 18 and move in a vertical plane with relation to the hub.

Rings 20 which are arranged upon opposite sides of the hub 2 extend between the band 10 and rim 19 and are connected with the rim 19 by suitable fastening elements such as screws, and the like, and designated in the drawings by the numeral 21, said rings serving as a housing for the outer ends of the spokes 15 and shoes 18 and also prevent lateral movement of the rim 19 with relation to the hub 2.

One of the rings 20 has connected therewith a toothed band 22 by means of which the wheel may be rotated upon an axle through the use of a chain connected with a motor, or the like.

The modified form of the invention shown in Figs. 4 and 5 in the drawings is identical with the construction of the preferred form of the invention with the exception that the plates 5 and 6 have passed therethrough pins 23 disposed at right-angles thereto and between the spoke pockets 9 with the ends of the pins received in depressions 24 formed in the rings 20 connected with the rim 19, said pins and depressions enabling the wheel to be turned when the wheel is connected with a driven axle.

When the wheel is in use upon a motor vehicle, or the like, it will be seen that through the provision of the springs 14 and the construction and arrangement of the spokes 15 and shoes 18 that the rim 19 is free to move in a vertical plane with relation to the hub 2 when an undue strain is imposed upon the wheel and that upon the wheel striking an obstruction the rim 19 may move circumferentially with relation to the hub upon the outer face of the shoes 18 which are held in frictional contact with the rim 19 by the springs 14 thus enabling the wheel to efficiently absorb all shocks and jars incident to the travel of a heavily loaded vehicle over an uneven road.

In the modified form of the invention shown in Figs. 4 and 5 in the drawings, it will be seen that the rim 19 may move in a vertical plane with relation to the hub 2 and also slide on the shoes 18 to a limited degree and that when the modified form of wheel is used in connection with a driven axle, the pins 23 and rings 20 will lock the hub to the rim so that the vehicle may be propelled in the usual manner.

From the foregoing description, taken in connection with the accompanying drawings, it is at once apparent that a resilient wheel has been provided which though simple in construction and inexpensive of manufacture, is highly efficient in use.

Having thus described the invention, what is claimed as new, is:

A resilient wheel comprising a pair of connected plates having radially extending channels therein forming spoke pockets communicating with a centrally arranged chamber communicating with centrally located depressions in said plates forming a chamber therein, a band arranged in said chamber and closing the inner ends of said spoke pockets, spokes mounted to slide in said pockets and having closed outer ends with bearing pockets therein, expansion springs arranged within said spokes and pockets and bearing against the closed ends of the spokes and said band, shoes having bearing heads mounted to turn in said bearing pockets, a rim frictionally engaged with said shoes and mounted to slide thereon, rings connected with opposite sides of said rim and having contact with said shoes, said rings having recesses formed therein, and pins passing transversely between said plates and having their ends received in said recesses.

In testimony whereof I affix my signature.

WALTER HENRY DAVIDSON.

Copies of this patent may be obtained for five cents each, by addressing the "Commissioner of Patents, Washington, D. C."